United States Patent [19]

Schael et al.

[11] 4,261,830
[45] Apr. 14, 1981

[54] DIALYZER

[75] Inventors: Wilfried Schael, Bad Homburg; Peter Konang, Frankfurt; Gerd Krick, Usingen, all of Fed. Rep. of Germany

[73] Assignee: Dr. Eduard Fresenius Chemisch-pharmazeutische Industrie KG Apparatebau KG, Bad Homburg, Fed. Rep. of Germany

[21] Appl. No.: 87,312

[22] Filed: Oct. 22, 1979

[30] Foreign Application Priority Data

Nov. 4, 1978 [DE] Fed. Rep. of Germany ....... 2847945

[51] Int. Cl.$^3$ ............................................. B01D 31/00
[52] U.S. Cl. ................................. 210/321.3; 264/258
[58] Field of Search ..................... 210/321 B, 346, 486; 264/249, 257, 258

[56] References Cited

U.S. PATENT DOCUMENTS

| 3,362,540 | 1/1968 | Bluemle, Jr. ...................... 210/321 B |
| 3,501,010 | 3/1970 | Critchell et al. .................. 210/346 X |
| 3,565,258 | 2/1971 | Lavender et al. ................. 210/321 B |

FOREIGN PATENT DOCUMENTS

| 2252341 | 9/1973 | Fed. Rep. of Germany ....... 210/321 B |
| 2642106 | 4/1977 | Fed. Rep. of Germany ....... 210/321 B |
| 2652856 | 5/1978 | Fed. Rep. of Germany ....... 210/321 B |
| 2812079 | 5/1978 | Fed. Rep. of Germany ....... 210/321 B |

*Primary Examiner*—Frank A. Spear, Jr.
*Attorney, Agent, or Firm*—W. G. Fasse; D. F. Gould

[57] ABSTRACT

The present blood exchange apparatus comprises a plurality of main layers stacked to form a package. Each main layer includes a membrane envelope enclosing an intermediate netting layer. Spacers space the main layers so that blood may flow between adjacent main layers and an exchange liquid may flow within the intermediate netting layers. The facing ends of a package are embedded in a pourable sealing compound in such a manner that the spaces between adjacent membrane envelopes are open. After securing the spacers to each facing end of the main layers, the spacers and thus the layers are connected and then dipped into a curable sealing compound. The spacers have corner extensions which extend out of the sealing compound. Holes in the corner extensions expose the intermediate netting layers.

10 Claims, 12 Drawing Figures

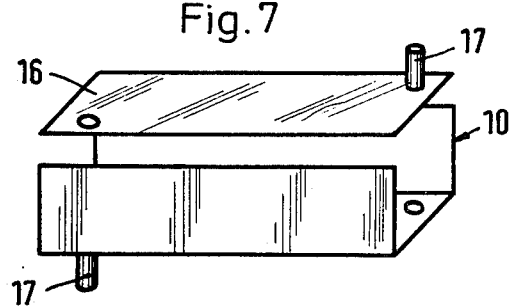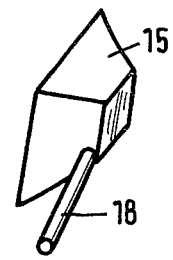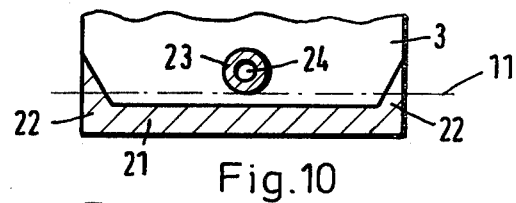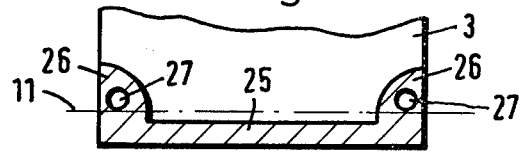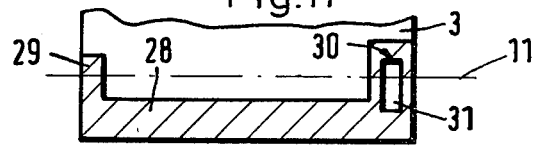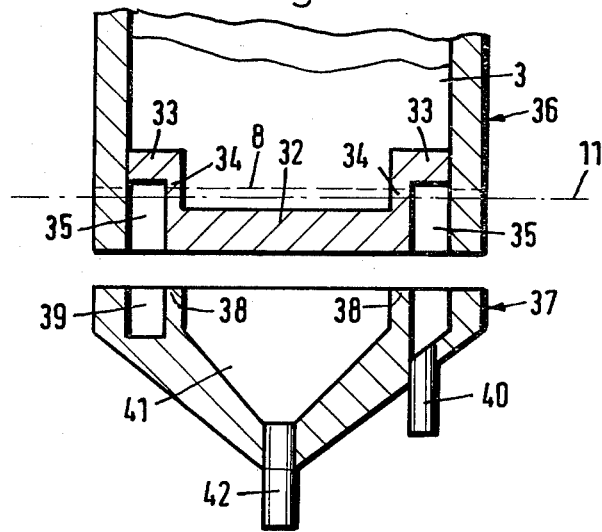

DIALYZER

BACKGROUND OF THE INVENTION

The invention relates to a blood exchange apparatus or rather dialyzer comprising a plurality of layers each including a membrane envelope and an intermediate netting layer enclosed by said membrane envelope. The layers are held spaced from each other at a small distance by spacers. Blood is conducted between adjacent layers and an exchange liquid is conducted within the intermediate netting layers.

Such dialyzer devices have been constructed in accordance with the original suggestions of Hoeltzenbein and according to the principle of Guarino.

Such known dialyzer devices operate according to the cross flow principle. This entails the disadvantage that the masses which are transported through the exchange surfaces of the membrane are small as compared to the counter-current and that the exchange distance is relatively small.

The spacing between the layers is produced by an applied adhesive mass which sets within a short time. In this connection there is the disadvantage that the edges of the adhesive mass cannot always be produced cleanly along a straight line so that dead corners occur in these areas in which blood residues may settle and coagulate. Such blood exchange devices are used as dialyzers, hemofilters, and other similar medical applications. However, it is conceivable to use exchange devices constructed basically in the same manner also in chemical process technology.

The production of known blood exchange devices has been mainly performed by hand heretofore which disadvantageously affects the price.

OBJECTS OF THE INVENTION

In view of the above, it is the aim of the invention, to achieve the following objects singly or in combination:

to construct a blood exchange device such as a dialyzer in such a manner that it may be easily produced by fully automated mass production procedures, while simultaneously having a better efficiency relative to known devices of this type;

to construct a blood exchange device of the above type so that it may be used for a counter-current flow operation rather than in accordance with the cross flow principle; and to construct these exchange devices so that they may be useful in other chemical processes and are thus not limited to use in a blood exchange treatment.

SUMMARY OF THE INVENTION

According to the invention there is provided a liquid exchange device of the type mentioned above, wherein the layers are embedded with their facing side in a pourable sealing mass in such a manner that the intermediate spaces between adjacent membrane envelopes are open. Thus, it is basically possible to construct such an exchange device for use in connection with the counter-current principle, especially for blood exchange treatments.

According to a further embodiment of the invention it is provided that spacers are arranged at the corners of the facing sides which spacers fill, in a sealing manner, the intermediate space between adjacent membrane hoses. The spacers and the layers comprise apertures registering with one another and extending perpendicular to the plane of the layers. The intermediate netting layers are exposed at the walls of the apertures. In this manner it is possible to introduce an exchange liquid instead at the facing side from another direction into the intermediate netting layers.

A method according to the invention for producing a liquid exchange device, especially a blood exchange device, provides that the prepared layers which comprise a membrane envelope and an intermediate netting layer are equipped at the facing ends with a spacer which comprises a narrow, strip shaped zone with connected, inwardly reaching extensions. The layers are connected with one another in a sealing manner in the area of the spacers to form a package. The facing ends of the packages are subsequently dipped into a pourable sealing mass to a depth slightly larger than the portion of the spacer extending in parallel to the facing wall. Subsequent to the setting the facing ends are severed in an area between the inner edge of the spacer and the inner edge of the dipped zone parallel to the facing surface.

Further advantageous embodiments of the invention may be taken from the accompanying claims and the following specification.

BRIEF FIGURE DESCRIPTION

In order that the invention may be clearly understood, it will now be described, by way of example, with reference to the accompanying drawings, wherein:

FIG. 7 is a schematic illustration of a housing of an exchange device according to the invention;

FIG. 8 shows a housing cover for a housing according to FIG. 7;

FIG. 9 is a top plan view of the facing end of one layer for illustrating the configurations of the spacers;

FIG. 10 is an illustration according to FIG. 9 with a differently shaped spacer;

FIG. 11 is an illustration according to FIG. 9 or 10 with a further spacer of modified shape; and FIG. 12 is an illustration according to FIGS. 9 to 11 with a further example of an embodiment of a spacer and a specially constructed housing cover.

DETAILED DESCRIPTION OF A PREFERRED EXAMPLE EMBODIMENT AND OF THE BEST MODE OF THE INVENTION

Figure 1:
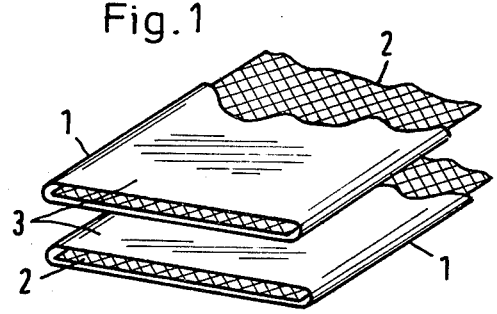
FIG. 1 shows schematically several layers as they are being used for producing of blood exchange devices.

FIG. 1 shows schematically two layers of a blood exchange apparatus. Such layers are known from the prior art and are used in the same or in a similar construction also for the blood exchange device according to the invention.

Intermediate netting layers 2 are arranged inside the membrane envelope 1 which so far have been constructed in the manner of a hose. The size of the hose shape thereby determines the width of the individual main layers 3 of which such a blood exchange device is manufactured. Instead of using a hose type membrane envelope 1 it is also possible to use strips of such membrane foils applied to both sides of an intermediate netting layer 2 whereby the membrane foils are welded or glued along the sides. A blood exchange device comprises about fifty or more of such layers forming a stack, whereby the layers, for example, have dimensions of 45×200 mm. The facing cross section of such a blood exchange device then is, for example, 45×45 mm. The smaller the dimensions are maintained, the smaller is, of course, the effectiveness of such a device because the mass transport is proportional to the membrane surface. Each main layer 3 includes a netting layer 2 between two membrane layers forming the envelope 1.

Figure 2:
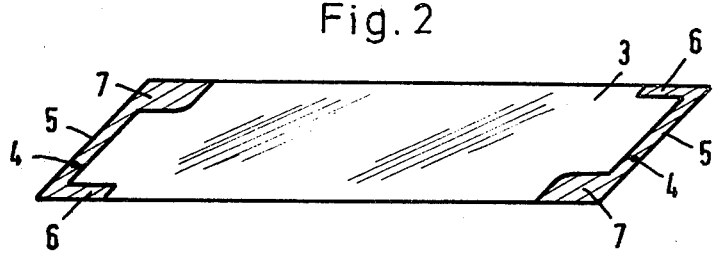
FIG. 2 shows schematically a top plan view of one layer of a blood exchange device according to the invention.

As indicated in FIG. 2, a spacer 4 is applied according to the invention to each of the layers along each facing edge. The spacer comprises a narrow zone 5 extending in parallel to the facing edge and extensions 6 or 7 reach along the lateral edges of the layers. The extensions 6 are narrower than the extensions 7 in the illustrated example embodiment. Said spacers 4 may be made of impervious thin foil and may be glued to the layers 3 or they may be printed onto the layers 3 in accordance with known methods.

Now the prepared layers are stacked to form a package, whereby simultaneously or subsequently all layers are glued to each other or welded to each other over the entire surface of the spacers 4 so that a sealing of the intermediate spaces between the layers 3 toward the facing edge and along a certain length range of the side edges of the layers, is achieved.

Figure 3:
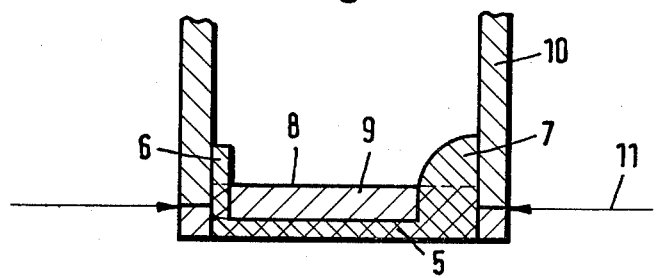
FIG. 3 is a top plan view of a facing end of one layer during the manufacturing process.
Figure 4:
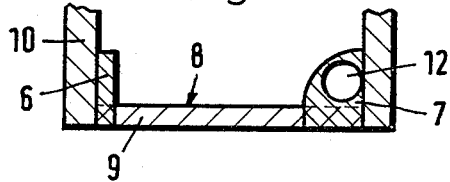
FIG. 4 is a top plan view according to FIG. 3 after further steps of the manufacturing process.

The package comprising a predetermined number of layers is now dipped with its facing side into a pourable sealing mass 9 to a line 8. This borderline 8 is located beyond the end of the narrow zone 5 of the spacer, however, on this side of the ends of the lateral extensions 6 and 7. The packet is, additionally, arranged in a housing 10. FIG. 3 schematically illustrates these relationships. Now the package is severed in parallel to the facing surface along a line 11. This line 11 is located in an area between the inner edge of the narrow zone 5 of the spacer and the borderline 8 to which the pourable sealing mass extends. This means that the narrow, strip shaped zone 5 of the spacer is severed and only portions of the lateral extensions 6 and 7 remain standing. The result is schematically shown in FIG. 4. Now a perforation 12 is made perpendicularly through the entire package by stamping or the like. The perforation 12 is spaced from the borderline 8 of the pourable sealing mass 9. This perforation is located within the boundaries of the extension 7 of the spacer and simultaneously beyond the borderline 8 of the pourable sealing mass.

Figure 5:
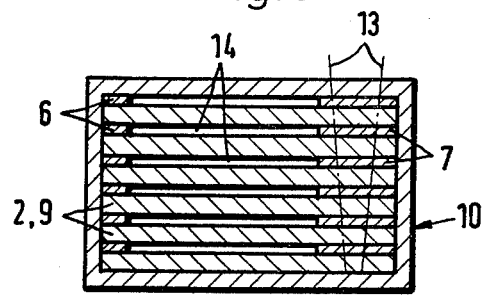
FIG. 5 shows schematically a facing view of a blood exchange device according to the invention.

FIG. 5 shows schematically a facing view of such a package and illustrates at the same time the effect which is caused by the presence of the spacers 4 during the dipping of the facing ends into the pourable sealing mass. The borderlines of the perforation 12 are shown at 13 in FIG. 5. They indicate that in this example embodiment the aperture is shaped to taper conically from the top downwardly. However, the apertures 12 may also have a cylindrical shape. The details will be discussed more fully below.

The spacers 4 thus perform a triple function. They define the spacing or the thickness of the gaps 14 between adjacent membrane envelopes or between adjacent layers. The spacers further prevent the penetration of the pourable sealing mass into the inner space of these gaps 14. For this purpose the lateral extensions 6 and 7 forming spacer members are pulled out along the lateral edges of each layer and beyond the borderline 8 of the pourable sealing mass. The spacer members 6 and 7 further serve for the sealing of the apertures 12 relative to the gaps 14, please see FIG. 6.

FIGS. 7 and 8 show a view of a housing 10 and a housing cover 15. The housing comprises one connecting nipple 17 on each of the two cover surfaces 16. The connecting nipple 17 is axially aligned to register with the apertures 12. The housing covers 15 comprise connecting nipples 18 for the supply of liquid into the gaps 14 between the layers 3.

Figure 6:
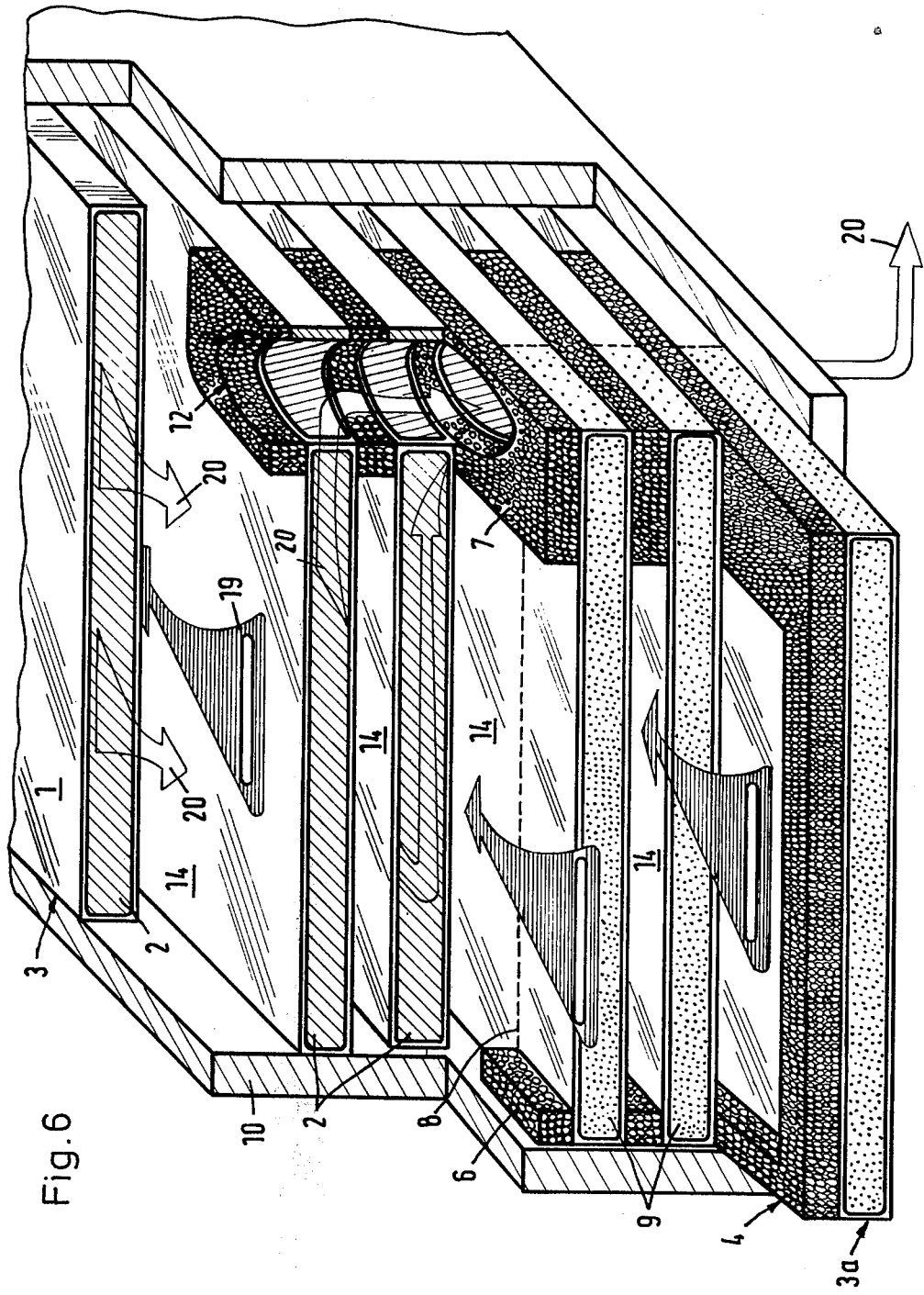
FIG. 6 is a facing view of a portion of a blood exchange device according to the invention, whereby the device is shown in section in several planes.

FIG. 6 illustrates the operation and the structure of the blood exchange device according to the invention, FIG. 6 shows the facing end of a blood exchange device according to the invention with different vertical sectional planes within the individual layers 3.

The lowest layer 3a is shown prior to the severing along the severing line 11, thereby showing the spacer 4 arranged on the layer 3a in its original form. After the severing only the lateral extensions 6 and 7 of the spacers remain. The pourable sealing mass 9 has penetrated to the borderline 8 into the intermediate netting layers 2 of the layers 3, thereby closing or seaing the ends of the hoses 1.

The extensions 7 seal the circumference of the aperture 12 relative to the gaps 14 between the individual main layers 3. Within the apertures 12 the intermediate netting layers 2 are exposed between the membrane envelopes 1.

In this manner it is possible that a first liquid, for example blood, may enter from the facing side of the blood exchange device into the gaps 14 between the layers 3 in the direction of the dark arrows 19. A second liquid, for example a dialysis solution, may flow in the opposite direction in the sense of the light arrows 20 through the spaces within the intermediate netting layers 2 inside the envelopes 1 and through the apertures 12 into the intermediate netting layers or the second liquid may be withdrawn through these apertures 12.

Both liquids may exchange molecules through the semi-permeable membrane hoses 1.

The spacer 21 illustrated in FIG. 9 has triangularly shaped lateral extensions 22, whereby a more uniform inflow is achieved. Further, in this illustrated example embodiment an additional spacer 23 is arranged to surround an aperture 24. The aperture 24 corresponds to the apertures 12 of the example embodiment according to FIGS. 2 to 8.

In the example embodiment according to FIG. 10, the spacer 25 is provided with two lateral extensions 26 which are equal to each other and each of which is provided with an aperture 27 which corresponds again to the apertures 12.

The spacer 28 according to FIG. 11 comprises extensions 29 and 30 which are similar to those shown in FIGS. 2 to 4. The aperture 31 through the wider extension 30 is not circular in this embodiment but rather rectangularly shaped.

The spacer 32 according to FIG. 12 comprises two lateral extensions 33 which are equal to each other. These extensions are connected with the narrow, center zone through back set lands 34.

The perforations 35 which are provided in these spacers connect into the facing surfaces of the layers 3. It is seen, that after the severing along the line 11 the central zone of the intermediate netting layers is sealed to the borderline 8 by means of the pourable sealing mass while in the area of the aperture 35 the facing edges of the intermediate netting layers are exposed, said spacing edges being vertically aligned with the extensions 33. Thus, it is possible that both liquids which are conducted through the blood exchange device may be made to enter or exit at the facing side. For this purpose the housing 36 of the blood exchange device is provided with a special housing cover 37. This cover comprises separation walls 38 which rest against the areas of the lands 34 in a sealing manner and which confine on the inner side a ring shaped collecting space 39. This collecting space merges into a connecting nipple 40. Inside the separation walls 38 a supply space 41 for the blood is formed and the supply space merges outwardly into a connecting nipple 42.

Although the invention has been described with reference to specific example embodiments, it is to be understood, that is is intended to cover all modifications and equivalents within the scope of the appended claims.

What is claimed is:

1. A dialyzer apparatus, comprising a plurality of main layers (3), each main layer (3) including a membrane envelope (1) and an intermediate netting layer (2) enclosed by said membrane envelope, spacer means (4) spacing the main layers (3) from each other at a given distance such, that blood may flow through intermediate spaces between adjacent membrane envelopes of the main layers (3) and an exchange liquid may flow within the intermediate netting layers inside said membrane envelopes, and wherein the facing ends of the main layers (3) are embedded in a pourable embedding compound (9) in such a manner that said envelopes are closed and that said intermediate spaces (14) between adjacent membrane envelopes (1) are open, whereby all of said intermediate spaces (14) are operatively interconnected, said spacer means including spacer members (6, 7; 23) arranged at said facing ends in said intermediate spaces, whereby the spacer members (6, 7; 23) fill, in a sealing manner, a portion of said intermediate spaces between adjacent membrane envelopes (1), and wherein at least certain of the spacer members (6, 7; 23) as well as the main layers (3) comprise aperture means (12, 24) located to register with one another, said aperture means extending substantially perpendicularly to the plane of the main layers (3), said intermediate netting layers being exposed at the walls of said apertures, whereby the insides of all membrane envelopes operatively communicate with one another, said spacer members sealing off any communication between said aperture means (14) and said intermediate spacers (14) and thus between said insides of the membrane envelopes and the intermediate spaces (14).

2. The dialyzer apparatus of claim 1, further comprising outer housing means for said plurality of main layers, said outer housing means including cover members as well as inflow and outflow channels in said cover members, said cover members being located at the facing ends of said outer housing means.

3. The dialyzer apparatus of claim 2, wherein said outer housing means have cover surfaces which are provided with connecting nipples located in register with the apertures of said spacer means.

4. The dialyzer apparatus of claim 3, wherein the connecting nipples are arranged at corners of the facing sides located spacially and diagonally opposite each other.

5. The dialyzer apparatus of claim 1, wherein said spacer members comprise separate sealing spacer elements (23) arranged between the main layers and intermediate the lateral edges thereof, and wherein the apertures (24) of a plurality of said main layers extend through these sealing spacer elements (23).

6. A method for manufacturing a dialyzer apparatus, comprising the following steps: preparing main layers comprising a membrane envelope and an intermediate netting layer inside said membrane envelope, providing each main layer with a spacer at each facing end thereof, said spacer comprising a narrow, strip shaped zone and having inwardly reaching extensions, connecting the main layers in the area of the spacers to one another in a sealing manner to form a stacked package, then dipping the facing ends of the stacked package into a pourable sealing compound to a slightly larger depth than the depth defined by said narrow, strip shaped zone, setting or curing the sealing compound whereby the ends of the envelopes are sealed, severing the package along a plane extending in parallel to the facing end surfaces in an area between the inner edge of the narrow, strip shaped zone and the inner edge (8) of the dipped zone, whereby intermediate spaces (14) between adjacent envelopes are opened and the envelope ends remain sealed, and making an aperture at least in one of the inwardly reaching spacer extensions, said aperture extending through the package, whereby the insides of all the envelopes are operatively interconnected by simultaneously sealed off from said intermediate spaces between adjacent envelopes.

7. the method of claim 6, wherein said spacers are applied to and solidly connected to the membrane envelopes.

8. The method of claim 6, comprising printing said spacers.

9. The method of claim 6, wherein said connecting step of the main layers comprises welding in the area of the spacers to form said package.

10. The method of claim 6, wherein said connecting step of the main layers comprises gluing in the area of the spacers to form said package.

* * * * *

UNITED STATES PATENT OFFICE
CERTIFICATE OF CORRECTION

Patent No. 4,261,830  Dated April 14, 1981

Inventor(s) Wilfried Schael et al

It is certified that error appears in the above-identified patent and that said Letters Patent are hereby corrected as shown below:

In the Abstract: line 1, after "apparatus", --or rather dialyzer-- should be inserted.

In claim 7, line 1, "the" (first occurrence) should be --The--.

Signed and Sealed this

Twenty-first Day of July 1981

[SEAL]

Attest:

Attesting Officer

GERALD J. MOSSINGHOFF

Commissioner of Patents and Trademarks